(12) United States Patent
Kruglick

(10) Patent No.: US 9,310,109 B2
(45) Date of Patent: Apr. 12, 2016

(54) ELECTROCALORIC EFFECT HEAT TRANSFER DEVICE DIMENSIONAL STRESS CONTROL

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/259,663

(22) Filed: Apr. 23, 2014

(65) Prior Publication Data

US 2014/0230453 A1    Aug. 21, 2014

Related U.S. Application Data

(62) Division of application No. 13/386,736, filed as application No. PCT/US2011/052569 on Sep. 21, 2011, now Pat. No. 8,739,553.

(51) Int. Cl.
  *F25B 21/00* (2006.01)

(52) U.S. Cl.
  CPC ........... *F25B 21/00* (2013.01); *F25B 2321/001* (2013.01); *Y02B 30/66* (2013.01)

(58) Field of Classification Search
  CPC ... F25B 21/00; F25B 2321/001; H01L 37/02; H01L 37/00; Y02B 30/66
  See application file for complete search history.

(56) References Cited

U.S. PATENT DOCUMENTS

| | | |
|---|---|---|
| 2,978,875 A | 4/1961 | Lackey et al. |
| 4,673,030 A | 6/1987 | Basiulis |
| 4,757,688 A | 7/1988 | Basiulis et al. |
| 4,929,516 A | 5/1990 | Pryor et al. |
| 5,040,381 A | 8/1991 | Hazen |

(Continued)

FOREIGN PATENT DOCUMENTS

| | | |
|---|---|---|
| CN | 86 1 01652 A | 11/1986 |
| CN | 1237791 A | 12/1999 |

(Continued)

OTHER PUBLICATIONS

Arik, Mehmet, "Enhancement of Pool Boiling Critical Heat Flux in Dielectric Liquids by Microporous Coatings," International Journal of Heat and Mass Transfer, 2007, pp. 997-1009, vol. 50.

(Continued)

*Primary Examiner* — Whitney T Moore
(74) *Attorney, Agent, or Firm* — Maschoff Brennan

(57) ABSTRACT

Technologies are generally described herein for electrocaloric effect heat transfer devices and methods effective to facilitate thermal energy transfer while mitigating mechanical stresses caused by expansion or contraction of electrocaloric effect material layers during thermal energy transfer operations. Some example heat transfer devices may include heat transfer stacks with at least two electrocaloric effect materials. Expanding electrocaloric effect material and contracting electrocaloric effect material are utilized to cancel the aggregate longitudinal dimensional change during application of an electric field. Some example heat transfer devices may utilize segmented electrocaloric effect material layers with stress relief gaps separating segments to mitigate delamination stress caused by lateral expansion or contraction of the electrocaloric effect material.

25 Claims, 8 Drawing Sheets

(56) References Cited

U.S. PATENT DOCUMENTS

| | | | |
|---|---|---|---|
| 5,229,566 A | | 7/1993 | Alexandres |
| 5,515,238 A | | 5/1996 | Fritz et al. |
| 5,690,849 A | | 11/1997 | De Vilbiss et al. |
| 6,105,381 A | | 8/2000 | Ghoshal |
| 6,285,079 B1 | | 9/2001 | Kunikiyo |
| 6,300,150 B1 | | 10/2001 | Venkatasubramanian |
| 6,556,752 B2 | | 4/2003 | Fang et al. |
| 6,588,215 B1 | | 7/2003 | Ghoshal |
| 6,711,904 B1 | | 3/2004 | Law et al. |
| 6,877,325 B1 | | 4/2005 | Lawless |
| 7,293,416 B2 | | 11/2007 | Ghoshal |
| 7,305,839 B2 | | 12/2007 | Weaver, Jr. |
| 7,421,845 B2 | | 9/2008 | Bell |
| 7,475,551 B2 | | 1/2009 | Ghoshal |
| 7,900,450 B2 | | 3/2011 | Gurin |
| 7,951,467 B2 | | 5/2011 | Tsushima |
| 8,869,541 B2 | | 10/2014 | Heitzler et al. |
| 2001/0023591 A1* | | 9/2001 | Maeda et al. ............. 62/3.2 |
| 2003/0033818 A1 | | 2/2003 | Kucherov et al. |
| 2005/0045702 A1 | | 3/2005 | Freeman et al. |
| 2005/0086948 A1 | | 4/2005 | Mike-Rojo et al. |
| 2005/0109041 A1 | | 5/2005 | Tanaka |
| 2005/0269065 A1 | | 12/2005 | Chen |
| 2006/0092694 A1 | | 5/2006 | Choi et al. |
| 2006/0137359 A1 | | 6/2006 | Ghoshal |
| 2006/0139116 A1 | | 6/2006 | Niki et al. |
| 2006/0201161 A1 | | 9/2006 | Hirai et al. |
| 2007/0007613 A1 | | 1/2007 | Wang et al. |
| 2008/0303375 A1 | | 12/2008 | Carver |
| 2009/0139244 A1 | | 6/2009 | Ullo et al. |
| 2009/0258248 A1 | | 10/2009 | Tsushima |
| 2009/0293499 A1 | | 12/2009 | Bell et al. |
| 2009/0301541 A1 | | 12/2009 | Watts |
| 2009/0308081 A1 | | 12/2009 | Quyang et al. |
| 2010/0037624 A1* | | 2/2010 | Epstein et al. ............. 62/3.1 |
| 2010/0096113 A1 | | 4/2010 | Varanasi et al. |
| 2010/0140772 A1 | | 6/2010 | Lin et al. |
| 2010/0175392 A1 | | 7/2010 | Malloy et al. |
| 2010/0212327 A1 | | 8/2010 | Barve et al. |
| 2010/0218511 A1 | | 9/2010 | Rockenfeller |
| 2010/0230653 A1 | | 9/2010 | Chen |
| 2010/0236258 A1 | | 9/2010 | Heitzler et al. |
| 2011/0016885 A1 | | 1/2011 | Zhang et al. |
| 2011/0063904 A1 | | 3/2011 | Chang et al. |
| 2011/0113791 A1 | | 5/2011 | Kruglick |
| 2011/0146308 A1 | | 6/2011 | Casasanta |
| 2011/0203839 A1 | | 8/2011 | Iwamoto |
| 2011/0309463 A1 | | 12/2011 | Kruglick |
| 2012/0055174 A1 | | 3/2012 | Kruglick |
| 2012/0267090 A1 | | 10/2012 | Kruglick |
| 2013/0067934 A1 | | 3/2013 | Kruglick |
| 2013/0067935 A1 | | 3/2013 | Kruglick |

FOREIGN PATENT DOCUMENTS

| | | |
|---|---|---|
| CN | 1992358 A | 7/2007 |
| CN | 2932237 A | 8/2007 |
| CN | 101246947 A | 8/2008 |
| CN | 101291769 A | 10/2008 |
| CN | 101587934 A | 11/2009 |
| CN | 101842647 A | 9/2010 |
| EP | 0 194 475 A2 | 9/1986 |
| GB | 2420662 | 5/2006 |
| JP | H11177151 | 7/1999 |
| WO | WO 2006/056809 | 6/2006 |
| WO | 2008/137940 A1 | 11/2008 |
| WO | WO 2009/126344 | 10/2009 |

OTHER PUBLICATIONS

D.A. McNeil "Pressure Drop and Heat Transfer Distributions Around a Bundle of Drop and Heat Transfer Distributions of Plasma Treated Tubes Condensing Dropwise," EPSRC, UK Department of trade and Industry Report, Dec. 1999.

Neese, B. et al., "Large Electrocaloric Effect in Ferroelectric Polymers Near Room Temperature," Science 321, No. 5890, (2008) (Abstract only).

Akcay, G. et al., "Influence of mechanical boundary conditions on the electrocaloric properties of ferroelectric thin films," Journal of Applied Physics 103 (2008).

Epstein, R.I., "Photonic and Electronic Cooling," International Conference on Emerging Trends in Electronic and Photonic Devices & Systems, ELECTRO '09, Dec. 2009.

Surana, R., "High Strain Functionally Graded Barium Titanate and its Mathematical Characterization," A dissertation submitted to the Division of Research and Advanced Studies of the University of Cincinnati, Sep. 27, 2004, pp. 1-104.

Terraneo et al., "Controlling the Energy Flow in Nonlinear Lattices: A Model for a Thermal Rectifier"; Physical Review Letters, vol. 88, No. 9, Mar. 4, 2002.

Li et al., "Interface Thermal Resistance Between Dissimilar Anharmonic Lattices"; Physics Review Letters, vol. 95, 104302 (2005).

Peyrard, M., "The Design of a Thermal Rectifier"; Europhysics Letters vol. 76, No. 49; (2006).

Kobayashi, et al., "An Oxide Thermal Rectifier"; http://arxiv.org/abs/0910.1153; Oct. 7, 2009.

Takeshi Morita et al., "Ferroelectric properties of an epitaxial lead zirconate titanate thin film deposited by a hydrothermal method below the Curie temperature," Applied Physics Letters 84, No. 25 (Jun. 21, 2004): 5094-5096.

D. Waller et al., "The effect of pulse duration and oxygen partial pressure on La0.7Sr0.3CoO3-delta and La0.7Sr0.3Co0.2Fe0.8O3-delta films prepared by laser ablation," Solid State Ionics 134, No. 1-2 (2000): 119-125.

Mischenko, et. al., "Giant Electrocaloric Effect in Thin-Film PbZr0.95Ti0.05O3" Science Mar. 3, 2006: vol. 311. No. 5765, pp. 1270-1271.

"Heat Diode Paves the Way for Thermal Computing," Technology Review, accessed at [http://www.technologyreview.com/blog/arxiv/24222/?a=f] Oct. 2009.

Vereshchagina, Elizaveta, "Investigation of Solid-State Cooler Based on Electrocaloric Effect," MS Thesis, 2007.

Sebald, G. et al., "Pyroelectric Energy Conversion: Optimization Principles," IEEE Transactions on Ultrasonics, Ferroelectrics, and Frequency Control, vol. 55, No. 3, Mar. 2008.

Fett, T. et al., "Nonsymmetry in the Deformation Behaviour of PZT," Journal of Materials Science Letters 17, No. 4, (1998) (Abstract only).

Dames, C., "Solid-State Thermal Rectification with Existing Bulk Materials," Journal of Heat Transfer 131, No. 6 (2009).

Ashley, S., "Cool Polymers: Toward the Microwave Over Version of the Refrigerator," Scientific America Magazine Printed Apr. 7, 2009.

International Search Report and Written Opinion for International Patent Application No. PCT/US2012/047013 mailed Oct. 15, 2012.

International Search Report and Written Opinion for International Patent Application No. PCT/US2011/033220 mailed Jun. 4, 2011.

International Search Report and Written Opinion for International Patent Application No. PCT/US2011/052577 mailed Dec. 21, 2011.

International Search Report and Written Opinion for International Patent Application No. PCT/US2010/039200 mailed Aug. 11, 2010.

International Search Report and Written Opinion for International Patent Application No. PCT/US2011/052569 mailed Dec. 20, 2011.

International Search Report and Written Opinion for International Patent Application No. PCT/US2010/047887 mailed Nov. 12, 2010.

Arik, Mehmet, "Enhancement of Pool Boiling Critical Heat Flux in Dielectric Liquids," Doctoral Dissertation submitted to University of Minnesota, Feb. 2001.

Salam, et al., "Pressure Drop Measurements in a Low Pressure Steam Condenser with a Horizontal Bundle of Staggered Tubes," Applied Thermal Engineering, 2004, pp. 1365-1379, vol. 24.

Seim, H. et al., "Growth of LaCoO3 Thin Films from β-diketonate precursors," Applied Surface Science, vol. 112, 1997 pp. 243-250.

Sharpe, W.N. Jr. and Sharpe, W. I., "Springer Handbook of Experimental Solid Mechanics," Atomic Force Microscopy in Solid Mechanics, Chapter 17.2.5 PZT Actuator Nonlinearities, Dec. 4, 2008, pp. 420-423.

(56) References Cited

OTHER PUBLICATIONS

Lankford, K., "Spacecraft Thermal Control Handbook," Chapter 10, Heat Switches, 2002, pp. 353-371.
Final Office Action mailed Aug. 2, 2012 in U.S. Appl. No. 12/999,684.
Non-Final Office Action mailed Mar. 16, 2012 in U.S. Appl. No. 12/999,684.
Non-Final Office Action mailed Sep. 12, 2013 in U.S. Appl. No. 13/386,736.
Non-Final Office Action mailed Nov. 7, 2013 in U.S. Appl. No. 13/384,859.
Non-Final Official Action dated Nov. 21, 2013 in U.S. Appl. No. 13/145,948.
Notice of Allowance mailed Jan. 27, 2014 in U.S. Appl. No. 13/386,736.
Non-Final Official Action dated Aug. 29, 2013 in U.S. Appl. No. 12/999,182.
Notice of Allowance dated Jan. 30, 2014 in U.S. Appl. No. 12/999,182.
Final Office Action mailed Jul. 16, 2014 in U.S. Appl. No. 13/384,859.
Final Office Action mailed Apr. 22, 2014 in U.S. Appl. No. 13/145,948.
"Thermal Analysis of Semiconductor Systems," White Paper, Freescale Semiconductor, Inc., accessed at https://web.archive.org/web/20130906091350/http://cache.freescale.com/files/analog/doc/white_paper/BasicThermalWP.pdf, accessed on Feb. 24, 2015, pp. 1-24.
International Search Report and Written Opinion for International Application No. PCT/US2012/055872 mailed on Nov. 20, 2012.
Kim, S.B., et al., "Thermal disturbance and its impact on reliability of phase-change memory studied by the micro-thermal stage," IEEE International Reliability Physics Symposium (IRPS), pp. 99-103 (2010).
Lencer, D., et al., "Design Rules for Phase-Change Materials in Data Storage Applications," Advanced Materials, vol. 23, No. 18, pp. 2030-2058 (May 10, 2011).
Servalli, G., "A 45nm Generation Phase Change Memory Technology," IEEE International Electron Devices Meeting, pp. 1-4 (Dec. 7-9, 2009).
Sinyavskii, Y. V., "Electrocaloric Refrigerators: A Promising Alternative to Current Low-Temperature Apparatus," Chemical and Petroleum Engineering, vol. 31, No. 6, pp. 295-306 (Jan. 1, 1995).
Supplementary European search report for EP2583320 dated Jan. 2, 2014.
Chinese First Office Action dated Apr. 7, 2015 as received in Application No. 201180073606.2.
Chinese First Office Action dated Apr. 9, 2015 as received in Application No. 201180073616.6.
International Preliminary Report on Patentability for PCT application No. PCT/US2010/039200 mailed on Dec. 19, 2012.
International Preliminary Report on Patentability for PCT application No. PCT/US2010/047887 mailed on Mar. 5, 2013.
International Preliminary Report on Patentability for PCT application No. PCT/US2011/052569 mailed on Mar. 25, 2014.
International Preliminary Report on Patentability for PCT application No. PCT/US2011/033220 mailed on Oct. 22, 2013.
International Preliminary Report on Patentability for PCT application No. PCT/US2011/052577 mailed on Mar. 25, 2014.
International Preliminary Report on Patentability for PCT application No. PCT/US2012/047013 mailed on Jan. 20, 2015.
Morita, T., et al., "Ferroelectric properties of an epitaxial lead zirconate titanate thin film deposited by a hydrothermal method below the Curie temperature," Applied Physics Letters, vol. 84, Issue 25, pp. 5094-5096 (2004).
Non Final Office Action mailed Jan. 13, 2015 in U.S. Appl. No. 13/813,588, Ezekiel Kruglick, filed Jan. 31, 2013.
Non-Final OA mailed Aug. 16, 2013, in U.S. Appl. No. 12/999,182, Ezekiel Kruglick, filed on Dec. 15, 2010.
Notice of Allowance mailed Jan. 27, 2014 in U.S. .Appl. No. 13/386,736, Ezekiel Kruglick, filed Jan. 24, 2012.
Notice of Allowance mailed May 5, 2014 in U.S. Appl. No. 12/999,182, Ezekiel Kruglick, filed Dec. 15, 2010.
Notice of Allowance mailed on Nov. 17, 2014, in U.S. Appl. No. 13/145,948, Ezekiel Kruglick, filed Jul. 22, 2011.
U.S. Notice of Allowance dated Jan. 30, 2014 in U.S. Appl. No. 12/999,182.
U.S. Office Action dated Mar. 16, 2012 in U.S. Appl. No. 12/999,684.
U.S. Official Action Dated Nov. 7, 2013 in U.S. Appl. No. 13/384,859.
U.S. Official Action dated Jun. 19, 2015 in U.S. Appl. No. 13/813,588.
U.S. Notice of Allowance dated Jun. 22, 2015 in U.S. Appl. No. 13/145,948.
Epstein et al., Electrocaloric Devices Based on Thin-Film Heat Switches, 2009 Journal of Applied Physics 106, 7 pp.
Bai et al, Direct measurement of Giant Electrocaloric Effect in BaTiO3 Multilayer Thick Film Structure Beyond Theoreticlal Prediction, 2010 Applied Physics Letters 96, 3 pp.
U.S. Official Action dated Jun. 23, 2015 in U.S. Appl. No. 13/810,324.

\* cited by examiner

ELECTROCALORIC EFFECT HEAT TRANSFER DEVICE DIMENSIONAL STRESS CONTROL

CROSS-REFERENCE TO RELATED APPLICATIONS

This application is a divisional application under 35 U.S.C. §121 of and claims priority under 35 U.S.C. §120 to co-pending U.S. National Stage filing, application Ser. No. 13/386,736 filed on Jan. 24, 2012 now issued as U.S. Pat. No. 8,739,553, which in turn is a national stage filing under 35 U.S.C. §371 of PCT application serial number PCT/US2011/052569, entitled, "Electrocaloric Effect Heat Transfer Device Dimensional Stress Control," filed Sep. 21, 2011. This application is related to co-pending application serial number PCT/US2010/039200, entitled, "Electrocaloric Effect Materials and Thermal Diodes," filed on Jun. 18, 2010, corresponding U.S. National Stage filing, application Ser. No. 12/999,684, entitled "Electrocaloric Effect Materials and Thermal Diodes," filed on Dec. 17, 2010, and is related to co-pending application serial number PCT/US2011/033220, entitled, "Heterogeneous Electrocaloric Effect Heat Transfer Device," filed on Apr. 20, 2011, each of which is herein incorporated by reference in their entirety.

BACKGROUND

Unless otherwise indicated herein, the materials described in this section are not prior art to the claims in this application and are not admitted to be prior art by inclusion in this section.

Electrocaloric effect materials are materials that can experience a temperature change when subjected to an applied electric field. This temperature change can be reversed upon the removal of the applied electric field. By physically coupling and decoupling electrocaloric effect material to and from a heat source, thermal energy can be dynamically transferred in quantities that are greater in one direction than the other. The described principles may be applied to a heat transfer device that can be utilized to transfer thermal energy away from a heat source.

The present disclosure appreciates that the electrocaloric effect and other materials used in various types of heat transfer devices may experience dimensional changes with the application and removal of the applied electric field. As a result, the volume of the electrocaloric effect material layers may undesirably change in the longitudinal direction of the thermal energy flow during operation of the heat transfer device, creating a cumulative strain that may result in undesirable bending, which may decouple the material from the heat source, decouple the material from the heat dump, or may result in some other mechanical problem or failure. Moreover, because of the lateral dimensional change of the electrocaloric effect material layers in a heat transfer device, these layers may experience a delamination stress that is cyclical with the application and removal of the applied electric field. The cyclic delamination stress may result in delamination with adjacent material layers, potentially leading to reliability issues.

SUMMARY

The present disclosure generally describes techniques for electrocaloric effect heat transfer devices and methods that may be effective to facilitate thermal energy transfer over a wide operating temperature range of a corresponding heat source. According to some example embodiments, a heat transfer device may include multiple electrocaloric effect materials. A first electrocaloric effect material may be configured to expand and to change temperature when an electric field is applied. A second electrocaloric effect material may be configured to contract and to change temperature when the electric field is applied. A thermal rectifier material may be configured in thermal contact with the electrocaloric effect materials, facilitating thermal energy transfer more readily in one direction than the other.

The present disclosure also generally describes methods that may be employed for transferring thermal energy from a heat source to a heat dump. Some example methods may include applying an electric field across an expanding electrocaloric effect material layer and across a contracting electrocaloric effect material layer of a heat transfer device that is configured in thermal contact with the heat source and the heat dump. During the application of the electric field, thermal energy can be transferred from the heat source to a heat dump through the expanding and contracting electrocaloric effect material layers while maintaining an approximate total length of the heat transfer device.

The present disclosure further generally describes a heat transfer device that may include a number of electrocaloric effect material layers and thermal rectifier material layers positioned between the electrocaloric effect material layers. The electrocaloric effect material layers may include at least one segmented expanding electrocaloric effect material layer and at least one segmented contracting electrocaloric effect material layer. The segmented expanding electrocaloric effect material layer can be configured to expand a longitudinal expansion distance when subjected to an electric field, while the segmented contracting electrocaloric effect material layer can be configured to contract a longitudinal contraction distance that is approximately equal to the longitudinal expansion distance when subjected to the electric field.

The present disclosure additionally generally describes a heat transfer device that may include first and second electrocaloric effect materials and a thermal rectifier material configured in thermal contact with each of the electrocaloric effect materials. Each electrocaloric effect material may be configured with a number of electrocaloric effect material segments separated by a number of stress relief gaps. The thermal rectifier material can be configured to facilitate thermal energy transfer between electrocaloric effect materials in one direction and to limit thermal energy transfer in the opposite direction.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
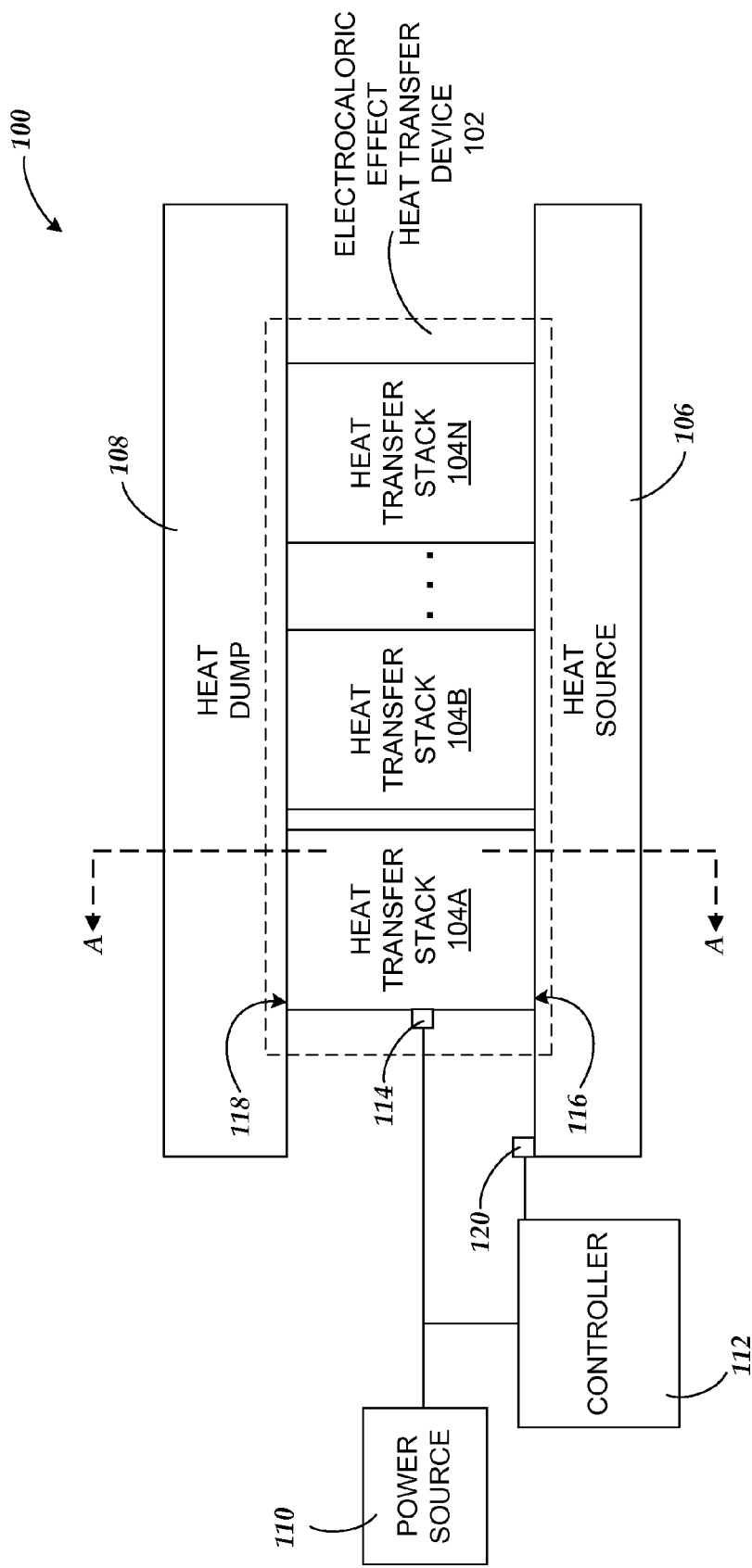
FIG. 1 is a functional block diagram illustrating an example electrocaloric effect heat transfer system with corresponding electrocaloric effect heat transfer device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to electrocaloric effect heat transfer techniques that control the mechanical stresses induced by dimensional changes of electrocaloric effect material layers during operation of a heat transfer device. In an illustrative implementation, an electrocaloric effect heat transfer device may be configured with multiple electrocaloric effect materials having longitudinal dimensional changes that approximately cancel one another during operation to minimize or approximately eliminate a longitudinal increase or decrease in length of a heat transfer stack while transferring thermal energy between a heat source and a heat dump. Each electrocaloric effect material layer of a heat transfer stack may be additionally or alternatively configured with any number of electrocaloric effect material segments having stress relief gaps between the segments. The stress relief gaps may allow for the absorption of lateral dimensional changes in the electrocaloric effect material so as to reduce or approximately eliminate the delamination stress within the electrocaloric effect material layer during operation of the heat transfer device.

FIG. 1 is a functional block diagram illustrating an example electrocaloric effect heat transfer system 100 with corresponding electrocaloric effect heat transfer device 102. The electrocaloric effect heat transfer device 102 includes one or more heat transfer stacks 104A-104N, arranged in accordance with at least some embodiments described herein. Heat transfer stacks 104A-104N may collectively be referred to as "104" and will be described in detail below with respect to FIGS. 2-9.

One surface 116 of the electrocaloric effect heat transfer device 102 can be thermally coupled to a heat source 106 to be cooled. An opposing surface 118 of the electrocaloric effect heat transfer device 102 can be thermally coupled to a heat dump 108, which receives thermal energy transferred from the heat source 106 by the electrocaloric effect heat transfer device 102. The thermal coupling may include direct surface-to-surface contact between the electrocaloric effect heat transfer device 102 and the heat source 106, as well as between the electrocaloric effect heat transfer device 102 and the heat dump 108, with or without a physical connection or coupling of the components. Alternatively, additional intervening components may be utilized to thermally couple the electrocaloric effect heat transfer device 102 to the heat source 106 and to the heat dump 108, provided that the intervening components provide a thermally conductive path that facilitates thermal energy transfer between the components of the electrocaloric effect heat transfer system 100. Other example intervening components may include, but are not limited to, thermal grease or paste, thermally conductive adhesives and adhesive tapes, thermally conductive shims, and solder.

The electrocaloric effect heat transfer device 102 can be electrically coupled to a power source 110 via one or more electrodes 114. It should be appreciated that although the electrodes 114 are represented in FIG. 1 as a single box or rectangle, implementations may include any number and type of electrodes 114 positioned appropriately throughout the electrocaloric effect heat transfer device 102, where the electrodes are operable to subject the various electrocaloric effect material layers of the heat transfer stacks 104 to electrical fields provided by the power source 110. For example, as will be described in further detail below with respect to FIG. 2, each heat transfer stack 104 includes alternating layers of electrocaloric effect material and thermal rectifier material.

According to some implementations, two electrodes 114 may be positioned on opposing sides of the electrocaloric effect material layer, optionally encompassing an adjacent thermal rectifier material layer. Example electrodes 114 are further described and illustrated in application serial number PCT/US2010/039200, entitled, "Electrocaloric Effect Materials and Thermal Diodes," filed on Jun. 18, 2010, and corresponding U.S. National Phase filing, U.S. application Ser. No. 12/999,684, entitled "Electrocaloric Effect Materials and Thermal Diodes," filed on Dec. 17, 2010, each of which is herein incorporated by reference in its entirety.

In some examples, an electrode control signal may be applied to the electrodes 114 from the power source 110 effective to generate an electric field across the associated electrocaloric effect material. The same or like electrode control signal may be applied substantially simultaneously to the electrodes 114 of every other electrocaloric effect material layer within a heat transfer stack 104. As every second layer of electrocaloric effect material within a heat transfer stack 104 is subjected to an electric field to produce a cold phase, the intervening layers of electrocaloric effect material are not subjected to an electric field, which creates a hot phase in those layers. As the electrode control signal is cyclically applied to the alternating layers of electrocaloric effect material, thermal energy is transferred from the hot phase layers to the cold phase layers in a direction from the heat source 106 to the heat dump 108.

The electrode control signal may be any type of signal that is effective to produce the desired temperature change within the electrocaloric effect material and corresponding heat transferring action that may facilitate transfer of thermal energy away from the heat source 106. According to some implementations, the electrode control signal may be an oscillating signal such as a voltage or current. The oscillating signal may be provided as any of a variety of signal waveforms. In some examples, the oscillating signal may be provided as a pulsed signal with a direct current (DC) voltage or DC current of a specified amplitude that is pulsed on or off (or simply between an upper voltage and lower voltage) with a specified duty cycle and period. In some additional examples, the oscillating signal may be provided as a sinusoidal signal with an alternating current (AC) voltage or AC current of a specified amplitude, frequency, phase and DC offset. In still additional examples, the oscillating signal may be provided as a ramped or sawtooth signal with a specified amplitude, rate, period and DC offset. In still other examples, the oscillating signal may be provided as a triangular signal with a specified amplitude, first ramp rate (e.g., increasing), second ramp rate (e.g., decreasing), period, and DC offset. Additional waveforms or combinations of waveforms are also contemplated.

The electrocaloric effect heat transfer system 100 may include a controller 112 that is configured to operatively control the electrode control signal or signals applied to the electrodes 114 from the power source 110 to create the desired electric fields that drive the transfer of thermal energy through the system. The controller 112 may be configured to operatively control the application of the electrode control signal according to an operating temperature of the heat source 116, as detected with a temperature sensor 120 that may be communicatively coupled to the controller 112. Embodiments of the present disclosure may be implemented within a number of heat transfer stacks 104, with varying electrocaloric effect material 202 composition among and between the heat transfer stacks 104 to efficiently transfer thermal energy over a wide operating temperature range, as described in detail and illustrated in application serial number PCT/US2011/033220, entitled, "Heterogeneous Electrocaloric Effect Heat Transfer Device," filed on Apr. 20, 2011, which is herein incorporated by reference in its entirety.

The controller 112 may include any type of computer hardware and/or software capable of providing the electrode control signal at the desired waveform characteristics according to, inter alia, the electrocaloric effect material used. The controller 112 may be included as part of the electrocaloric effect heat transfer device 102, or may be an external component of the electrocaloric effect heat transfer system 100 as shown in FIG. 1. The controller 112, as arranged in accordance with at least some embodiments will be described in greater detail below with respect to FIG. 11.

It should be appreciated that the heat source 106 may be any electronic component, computer component, appliance, or any device that may generate or absorb thermal energy during operation. Similarly, the heat dump 108 may include any thermally conductive material such as a metal or metal alloy heat sink material. In some examples, the heat dump 108 may be comprised of a computer case or an electronics case that is thermally conductive material capable of receiving thermal energy from the electrocaloric effect heat transfer device 102 at any operating temperature of the heat source 106. Alternatively, rather than including a metal or other solid material, the heat dump 108 may include gas or liquid. In some implementations, the heat dump 108 may include both conductive material and liquid or gas such as a heat pipe apparatus where the inside of the heat pipe may be comprised of liquid/gas and the exterior of the heat pipe may be a metal alloy. Additional combinations of thermally conductive materials, liquids and gases are contemplated. Example thermally conductive materials may include, but are not limited to, aluminum, copper, silver, gold, platinum, tungsten, and other metal or metal alloys. Although less thermally conductive than the metal and metal alloys described above, other materials that are suitable for high temperatures, such as ceramics, are also contemplated. Example gases suitable for the present application may include air, nitrogen, helium, and other gases. Noncorrosive gases may be suitable for the present application, including multi-component gas mixtures such as a Helium-Xenon mixture. Example liquids suitable for the present application gases include water, liquid nitrogen, liquid helium, ethylene glycol, alcohol, and ionic liquids.

Figure 2:
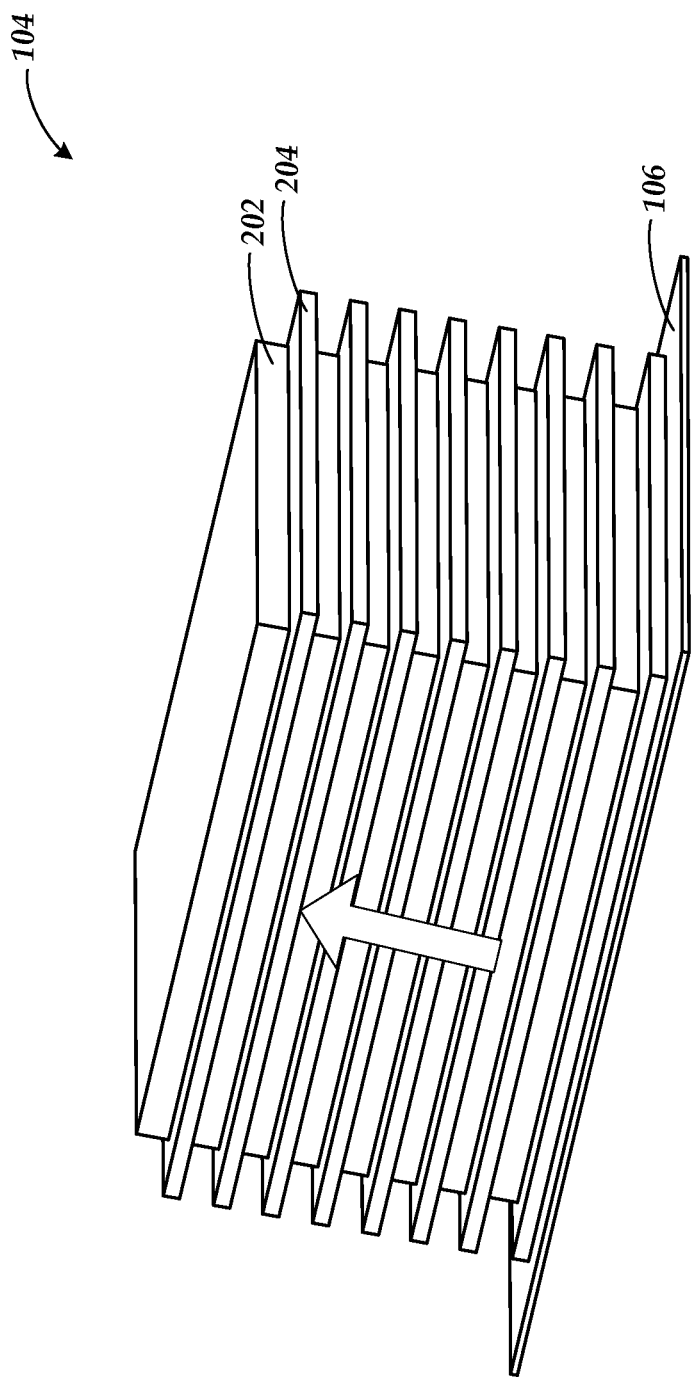
FIG. 2 is a perspective view of an example heat transfer stack of an electrocaloric effect heat transfer system.

FIG. 2 is a perspective view of an example heat transfer stack 104 of an electrocaloric effect heat transfer system 100, arranged in accordance with at least some embodiments described herein. The heat transfer stack 104 may be thermally coupled to a heat source 106. According to this example, the heat transfer stack 104 may include alternating layers of electrocaloric effect material 202 and thermal rectifier material 204. A layer of thermal rectifier material 204 may be positioned between the heat source 106 and the first layer of electrocaloric effect material 202 and configured such that a first surface of the thermal rectifier material 204 abuts a surface of the heat source 106, and an opposing second surface of the thermal rectifier material 204 abuts a surface of the first layer of electrocaloric effect material 202. In this manner, the first layer of electrocaloric effect material 202 can be configured in indirect thermal contact with the heat source 106 and direct thermal contact with the thermal rectifier material 204. Alternatively, it should be appreciated that any thermally conductive compound may intervene between the first layer of electrocaloric effect material 202 and the heat source 106, between the first layer of thermal rectifier material 204 and the heat source 106, or between the first layer of thermal rectifier material 204 and the first layer of electrocaloric effect material 202. Examples include, but are not limited to, a silver gel compound, copper plate, thermal grease or paste, thermally conductive adhesives and adhesive tapes, solder, and/or any type of thermally conductive shim. As an oscillating voltage or other electrode control signal can be supplied to the electrodes 114 coupled to the layers of electrocaloric effect material 202, a resulting electric field biases the electrocaloric effect material to facilitate the transfer of thermal energy away from the heat source 106 and through the layers of the heat transfer stack 104.

According to various implementations described herein, each heat transfer stack 104 may include at least two layers of electrocaloric effect material 202, utilizing at least two types of electrocaloric effect materials 202. As will be described in greater detail below with respect to FIGS. 3-6, the types of electrocaloric effect materials for a heat transfer stack 104 may be selected such that the total longitudinal expansion of electrocaloric effect material is substantially equivalent to the total longitudinal contraction of electrocaloric effect material when subjected to applied electric fields. In doing so, the total longitudinal dimensional change of the heat transfer stack 104 is substantially eliminated or minimized during operation, which reduces the mechanical stresses associated with expansion or contraction of a conventional heat transfer device 102.

The thermal rectifier material 204, which can also be referred to as a thermal diode, may have an asymmetrical thermal conductance characteristic where thermal energy may be transported more readily in one general direction than in another, as indicated by the open arrow in FIG. 2. Another way of stating the thermal energy transfer characteristic of the thermal rectifier material 204 is that the thermal rectifier material 204 may be configured to resist thermal energy transfer in a direction from the heat dump 108 to the heat source 106 after removal of the electric field from the corresponding heat transfer stack 104. Although for clarity purposes, each layer of the thermal rectifier material 204 is illustrated as a uniform sheet, it should be appreciated that according to various implementations, the thermal rectifier material 204 may include any quantity of uniform or non-uniform sheets of suitable materials having different temperature coefficients of thermal conductivity. The materials having different temperature coefficients of thermal conductivity may be configured in thermal contact with one another, or may utilize heat pipes, actuators, or any other implementation that can be adapted to allow thermal energy to more readily flow in one direction than the other. Moreover, the thermal rectifier material 204 characteristics may be substantially homogeneous throughout the various layers of a single heat transfer stack 104 in that each thermal rectifier material layer may include the same characteristics as other thermal rectifier material layers, including but not limited to the type of thermal rectifier material, as well as the layer dimensions and shape. Alternatively, the thermal rectifier material 204 layers may differ in any characteristics within a single heat transfer stack 104.

The precise characteristics of a single heat transfer stack 104 may vary according to the desired heat transfer performance for the particular implementation. For example, the electrocaloric effect material 202, the materials used within the thermal rectifier material 204, the positioning of the electrodes 114 and corresponding voltage application, and the method of creating a heat transfer stack 104 and associated layers may vary according to any number and type of heat transfer performance criteria associated with the particular implementation. These heat transfer stack characteristics and others are described in application serial number PCT/US2010/039200, entitled, "Electrocaloric Effect Materials and Thermal Diodes," filed on Jun. 18, 2010, and corresponding U.S. National Phase filing, U.S. application Ser. No. 12/999,684, entitled "Electrocaloric Effect Materials and Thermal Diodes," filed on Dec. 17, 2010, each of which is herein incorporated by reference in its entirety.

Figure 3:
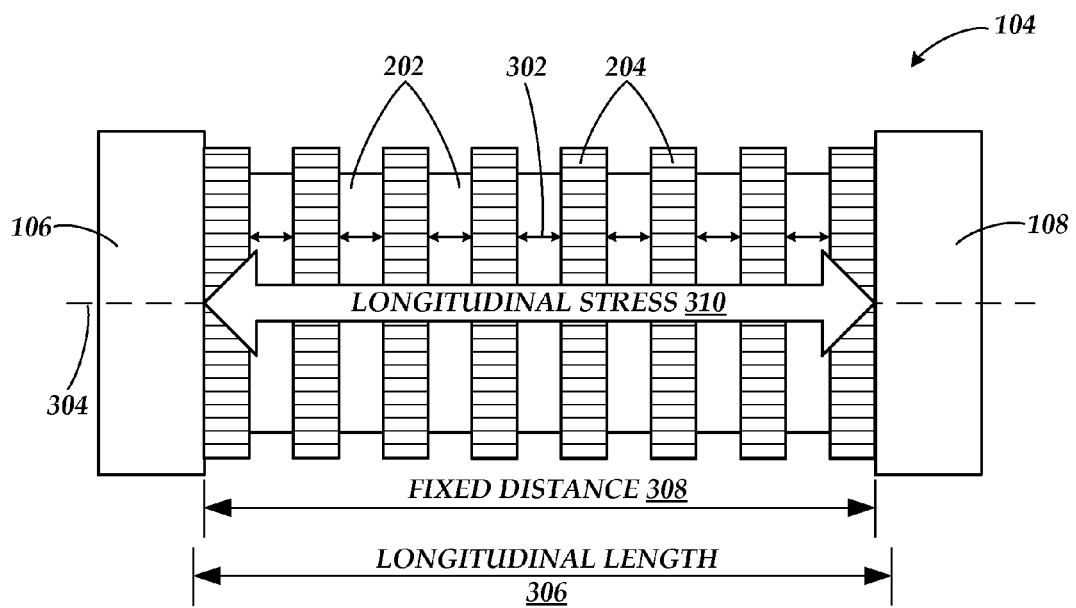
FIG. 3 is a cross-sectional view of an example electrocaloric effect heat transfer device taken along line A-A of FIG. 1 illustrating longitudinal stress within the heat transfer stack caused by a change in a longitudinal dimension of the heat transfer stack during operation.

FIG. 3 is a cross-sectional view of an example electrocaloric effect heat transfer device 102 taken along line A-A of FIG. 1 illustrating longitudinal stress 310 within the heat transfer stack 104 caused by a change in a longitudinal dimension of the heat transfer stack 104 during operation. As discussed above, due to the characteristics of various electrocaloric effect materials 202, an electric field applied to an electrocaloric effect material 202 produces a desired temperature change within the electrocaloric effect material and corresponding thermal energy transferring action that facilitates transfer of thermal energy away from the heat source 106, and also may produce a change in the volume of the electrocaloric effect material. A longitudinal dimensional change can be described as being an expansion or contraction along a longitudinal axis 304. An undesirable effect of this longitudinal dimensional change may arise when the one or more heat transfer stack 104 is coupled to the heat source 106 and the heat dump 108, which may be rigidly positioned a fixed distance 308 from one another as measured along the longitudinal axis 304.

As illustrated in this example by the expansion arrows 302, some electrocaloric effect materials 202 may expand when subjected to an electric field. When a heat transfer stack 104 is homogeneous with respect to the electrocaloric effect material layers such that only expanding electrocaloric effect materials 202 are used throughout the heat transfer stack 104, the expansion results in an unconstrained longitudinal length 306 of the heat transfer stack 104 that may be greater than the fixed distance 308 between the heat source 106 and the heat dump 108, which may create a longitudinal stress 310. An opposite but similarly undesirable effect may occur when a heat transfer stack 104 is homogeneous with respect to the electrocaloric effect material layers such that contracting electrocaloric effect materials 202 are used throughout the heat transfer stack 104. In this contracting example, the unconstrained longitudinal length 306 of the heat transfer stack 104 may be less than the fixed distance 308 between the heat source 106 and the heat dump 108, which may cause detachment or delamination between layers of the heat transfer stack 104 or between the heat transfer stack 104 and the heat source 106 or heat dump 108. For the purposes of this disclosure, the unconstrained longitudinal length 306 may be the dimension of the heat transfer stack 104 along the longitudinal axis 304 if the heat transfer stack were not coupled to the heat source 106 and heat dump 108 so that the heat transfer stack is free to expand to a maximum length or contract to a minimum length.

To eliminate or mitigate the longitudinal stress 310 caused by utilizing heat transfer stacks 104 with homogeneous electrocaloric effect material layers, some embodiments provided herein may utilize heat transfer stacks 104 having heterogeneous electrocaloric effect material layers. According to some of the various embodiments, a heat transfer stack 104 having heterogeneous electrocaloric effect material layers may have at least two types of electrocaloric effect materials 202, creating at least two types of electrocaloric effect material layers within the heat transfer stack 104. At least one type of electrocaloric effect material 202 may be an expanding material such that the electrocaloric effect material 202 expands a first longitudinal distance along the longitudinal axis 304 when subjected to an electric field. An example of a suitable expanding electrocaloric effect material 202 includes PZT, which is also known as lead zirconate titanate (Pb[$Zr_xTi_{1-x}$]$O_3$ $0 \leq x \leq 1$), although it should be appreciated that any electrocaloric effect material 202 that expands with exposure to an electric field may be utilized with the various embodiments disclosed herein.

At least one other type of electrocaloric effect material 202 within a heat transfer stack 104 having heterogeneous electrocaloric effect material layers may be a contracting type of material such that the electrocaloric effect material 202 contracts a second longitudinal distance along the longitudinal axis 304 when subjected to the electric field. Examples of suitable contracting electrocaloric effect materials 202 include, but are not limited to, polyvinylidene fluoride, or PVDF, copolymers such as P(VDF-TrFE) and P(VDF-TrFE-CFRE). Any electrocaloric effect material 202 that contracts with exposure to an electric field may be utilized with the various embodiments disclosed herein.

As will be discussed in detail below, any number and type of heterogeneous electrocaloric effect material layers may be utilized within various heat transfer stacks 104 to create a heat transfer stack 104 in which the unconstrained longitudinal length 306 is approximately equivalent to the fixed distance 308 between the heat source 106 and the heat dump 108. Such an arrangement of heterogeneous materials may cancel the expansion and contraction effects in the electrocaloric effect material layers. In other words, the aggregate first longitudinal distance may corresponding to the total expansion distance of the electrocaloric effect material layers, which may be approximately equivalent to the aggregate second longitudinal distance corresponding to the total contraction distance of the electrocaloric effect material layers. The longitudinal stress 310 described above with respect to a heat transfer stack 104 having homogeneous electrocaloric effect material layers may be eliminated or substantially mitigated.

Figure 4:
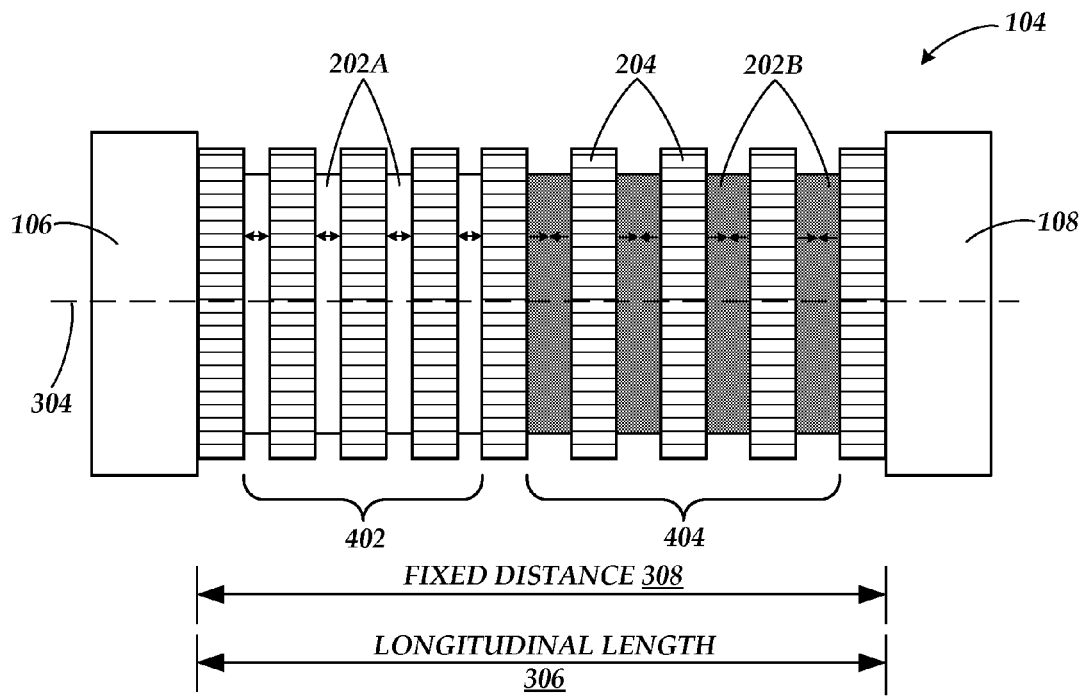
FIG. 4 is a cross-sectional view of an example electrocaloric effect heat transfer device taken along line A-A of FIG. 1 illustrating a heat transfer stack configured with heterogeneous electrocaloric effect material layers.

FIG. 4 is a cross-sectional view of an example electrocaloric effect heat transfer device 102 taken along line A-A of FIG. 1 illustrating a heat transfer stack 104 configured with heterogeneous electrocaloric effect material layers. As previously described, the heterogeneous electrocaloric effect material layers may include expanding electrocaloric effect material layers 202A and contracting electrocaloric effect material layers 202B. According to this embodiment, the expanding electrocaloric effect material layers 202A can be positioned consecutively adjacent to one another with a layer of thermal rectifier material 204 disposed between adjacent layers of expanding electrocaloric effect material to create an expanding heat transfer portion 402. Similarly, the contracting electrocaloric effect material layers 202B can be positioned consecutively adjacent to one another with a layer of thermal rectifier material 204 disposed between adjacent layers of contracting electrocaloric effect material to create a contracting heat transfer portion 404. During application of the electric field, the longitudinal expansion distance of the expanding heat transfer portion 402 along the longitudinal axis 304 may approximately equal the longitudinal contraction distance of the contracting heat transfer portion 404 along the longitudinal axis 304. In this manner, the unconstrained longitudinal length 306 of the heat transfer stack 104 may be approximately equivalent to the fixed distance 308 between the heat source 106 and the heat dump 108, effectively negating any longitudinal stress 310 or delamination during operation of the heat transfer device.

According to some embodiments, the heat transfer stack 104 may include an identical number of expanding electrocaloric effect material layers 202A and contracting electrocaloric effect material layers 202B. The expanding electrocaloric effect material layers 202A may be grouped and positioned adjacent to one another at either the heat source side of the heat transfer stack 104, or adjacent to the heat dump side of the heat transfer stack 104. Similarly, the contracting electrocaloric effect material layers 202B may be grouped at one side or the other of the heat transfer stack 104. In this example and others shown and described herein, the layers of thermal rectifier material 204 may be identical throughout the heat transfer stack 104, although it should be appreciated that the thermal rectifier material layers may be similarly heterogeneous as described herein with respect to the electrocaloric effect material layers.

The expanding electrocaloric effect material layers 202A shown in FIG. 4 are shown to be thinner than the contracting electrocaloric effect material layers 202B. However, it should be appreciated that the expanding electrocaloric effect material layers 202A and the contracting electrocaloric effect material layers 202B may be any thickness with respect to one another. According to some embodiments, the expanding electrocaloric effect material layers 202A may be thicker than the contracting electrocaloric effect material layers 202B. According to some other embodiments, the expanding electrocaloric effect material layers 202A and the contracting electrocaloric effect material layers 202B may be of substantially equivalent thickness. The precise dimensions of the electrocaloric effect material 202 within the various layers may depend on any number of factors, including but not limited to, the expansion and contraction characteristics of the selected electrocaloric effect materials 202, the number of desired electrocaloric effect material layers, and the fixed distance 308 between the heat source 106 and the heat dump 108. In various configurations, the aggregate longitudinal expansion and contraction distances of the expanding and contracting electrocaloric effect material layers 202A/202B may be substantially zero during the cold and hot phases of operation of the heat transfer device 102.

Figure 5:
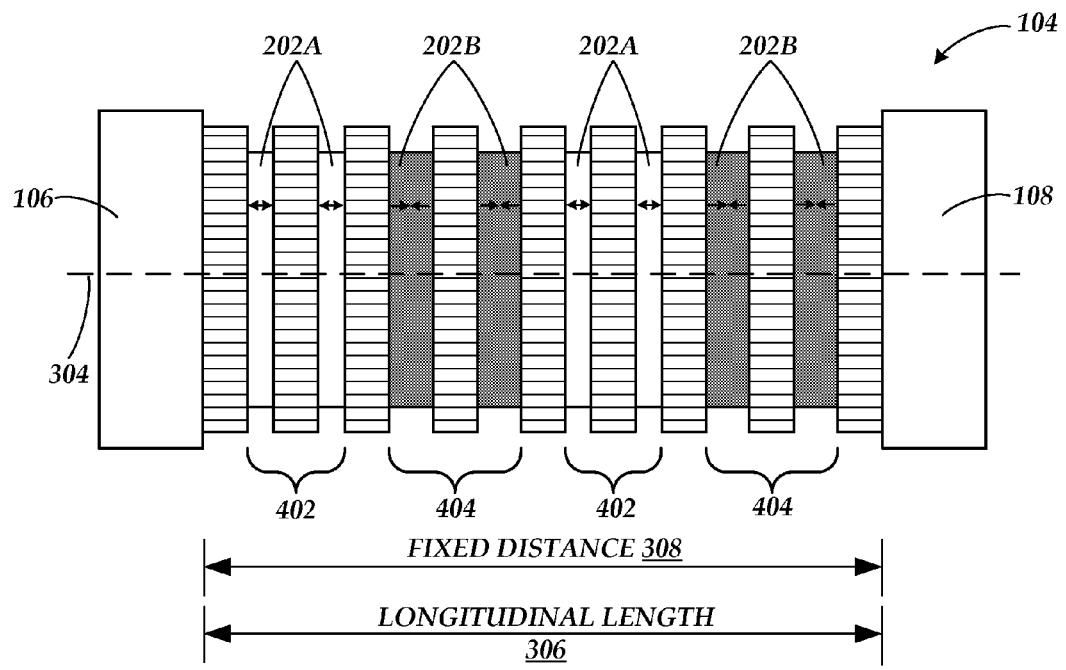
FIG. 5 is a cross-sectional view of an example electrocaloric effect heat transfer device taken along line A-A of FIG. 1 illustrating an alternative configuration of a heat transfer stack configured with heterogeneous electrocaloric effect material layers.

FIG. 5 is a cross-sectional view of an example electrocaloric effect heat transfer device 102 taken along line A-A of FIG. 1 illustrating an alternative configuration of a heat transfer stack 104 configured with heterogeneous electrocaloric effect material layers. According to this example, a heat transfer stack 104 may include alternating groups of expanding heat transfer portions 402 and contracting heat transfer portions 404. Further embodiments (not shown) may include alternating single expanding and contracting electrocaloric effect material layers rather than grouping like layers, or may include any desired or random arrangement of layers. The specific groupings and arrangement of expanding electrocaloric effect material layers 202A and contracting electrocaloric effect material layers 202B may depend on any number of factors, including but not limited to, a thickness of the expanding electrocaloric effect material layers 202A, a thickness of the contracting electrocaloric effect material layers 202B, a thickness of each layer of thermal rectifier material 204, a total length of the heat transfer device or fixed distance 308 between the heat source 106 and the heat dump 108, an expansion characteristic or attribute of the expanding electrocaloric effect material, a contraction characteristic or attribute of the second electrocaloric effect material, and the characteristics of the electric field to be applied to the electrocaloric effect material layers. As discussed above, this disclosure is not limited to any particular thickness of each layer, or thickness ratio or other relationship between the types of electrocaloric effect material layers.

Figure 6:
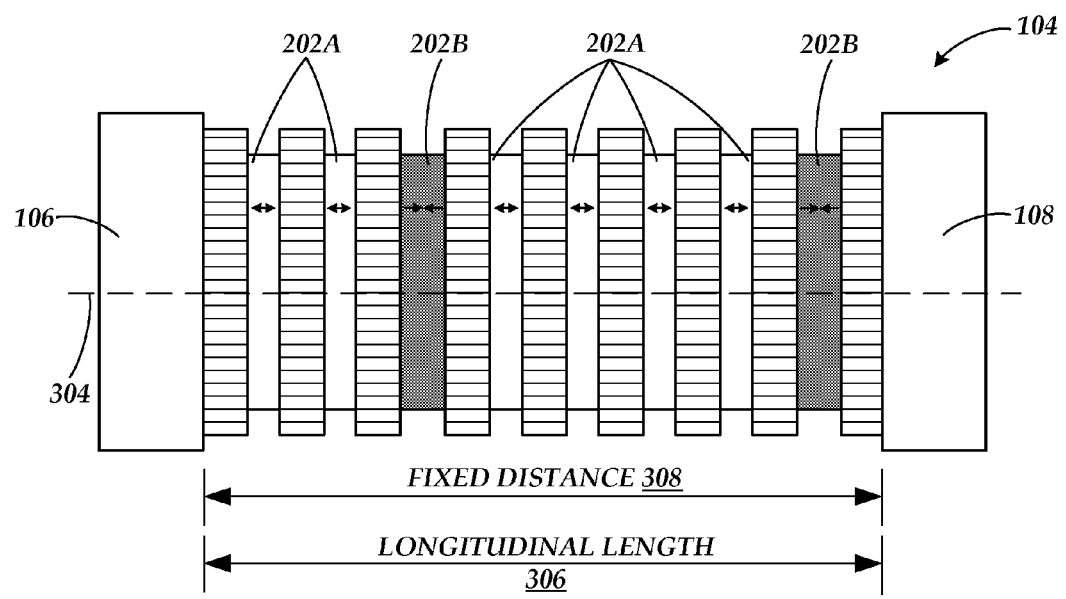
FIG. 6 is a cross-sectional view of an example electrocaloric effect heat transfer device taken along line A-A of FIG. 1 illustrating yet another alternative configuration of a heat transfer stack configured with heterogeneous electrocaloric effect material layers.

FIG. 6 is a cross-sectional view of an example electrocaloric effect heat transfer device 102 taken along line A-A of FIG. 1 illustrating yet another alternative configuration of a heat transfer stack 104 configured with heterogeneous electrocaloric effect material layers. This example illustrates that the various embodiments are not limited to an equivalent number of expanding electrocaloric effect material layers 202A and contracting electrocaloric effect material layers 202B. Any suitable ratio of expanding to contracting electrocaloric effect material layers may be utilized to effectively cancel the total longitudinal dimensional change in the heat transfer stack 104 so that the unconstrained longitudinal length 306 of the heat transfer stack 104 may remain approximately equivalent to the fixed distance 308 between the heat source 106 and the heat dump 108.

Although not specifically illustrated, it should also be appreciated that more than two types of electrocaloric effect materials 202 may be utilized within a single heat transfer stack 104 or within adjacent heat transfer stacks 104. For example, multiple expanding electrocaloric effect materials 202 may be used to create multiple types of expanding electrocaloric effect material layers 202A, which may be interspersed among multiple types of contracting electrocaloric effect material layers 202B created from multiple contracting electrocaloric effect materials 202. For clarity purposes, the various figures illustrate a representation for an expanding electrocaloric effect material layer 202A and a representation for a contracting electrocaloric effect material layer 202B. Each of these representations may include any number and type of corresponding electrocaloric effect materials 202.

Figure 7:
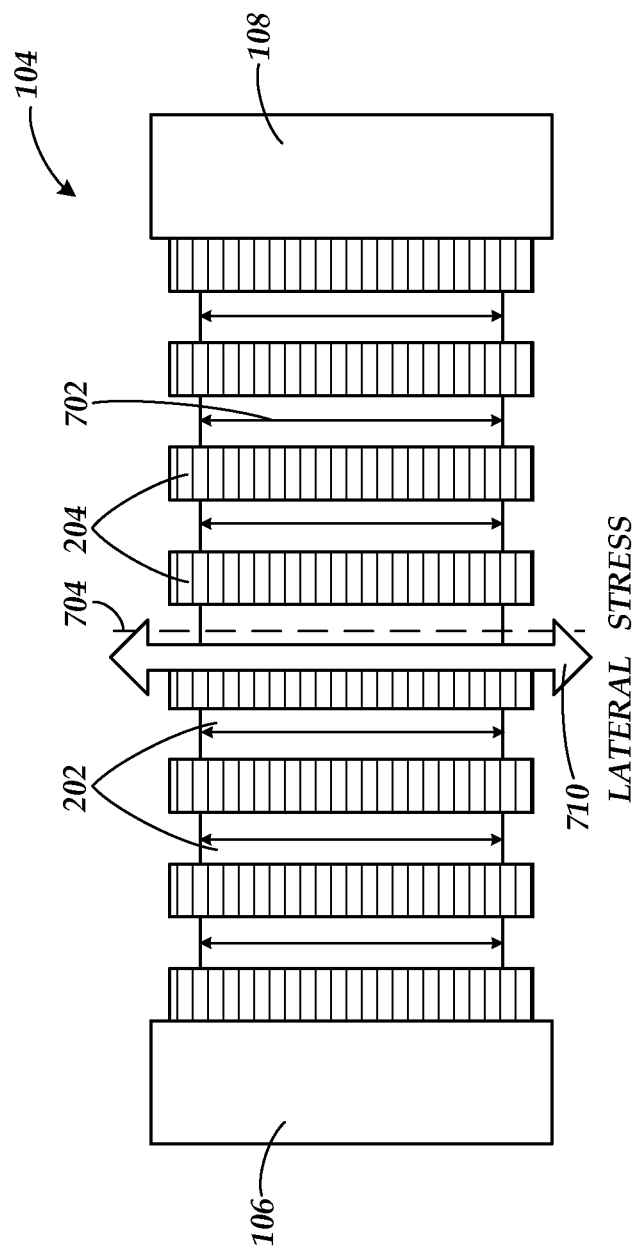
FIG. 7 is a cross-sectional view of an example electrocaloric effect heat transfer device taken along line A-A of FIG. 1 illustrating lateral stress within the heat transfer stack caused by a change in a lateral dimension of the heat transfer stack during operation.

FIG. 7 is a cross-sectional view of an example electrocaloric effect heat transfer device 102 taken along line A-A of FIG. 1 illustrating lateral stress 310 within the heat transfer stack 104 caused by a change in a lateral dimension of the heat transfer stack 104 during operation. As previously discussed, an electric field applied to an electrocaloric effect material 202 may produce a change in the volume of the electrocaloric effect material. In addition to the longitudinal dimensional change that may be controlled utilizing a heterogeneous electrocaloric effect material layer configuration described above, an electrocaloric effect material layer may experience a lateral dimensional change that may create a lateral stress 710 between adjacent layers of the heat transfer stack 104.

A lateral dimensional change can be described as being an expansion or contraction along a lateral axis 704. The lateral dimensional change is illustrated in FIG. 7 by the expansion arrows 702, although it should be appreciated that the lateral dimensional change may alternatively be a contraction, such as when utilizing the contracting electrocaloric effect material layers 202B described above. An undesirable effect of this lateral dimensional change is that the lateral stress 710, or delamination stress, may cause the electrocaloric effect material layers to separate from the adjacent thermal rectifier material layers or otherwise may cause damage to the heat transfer stack 104.

To eliminate or mitigate the lateral stress 710 caused by expansion or contraction of the electrocaloric effect material layers, the embodiments provided herein may utilize stress relief gaps within the electrocaloric effect material layers to separate the layers into segments. The stress relief gaps between the multiple electrocaloric effect material segments may reduce the accumulation of the delaminating stress in the plane of the electrocaloric effect material layer.

Figure 8:
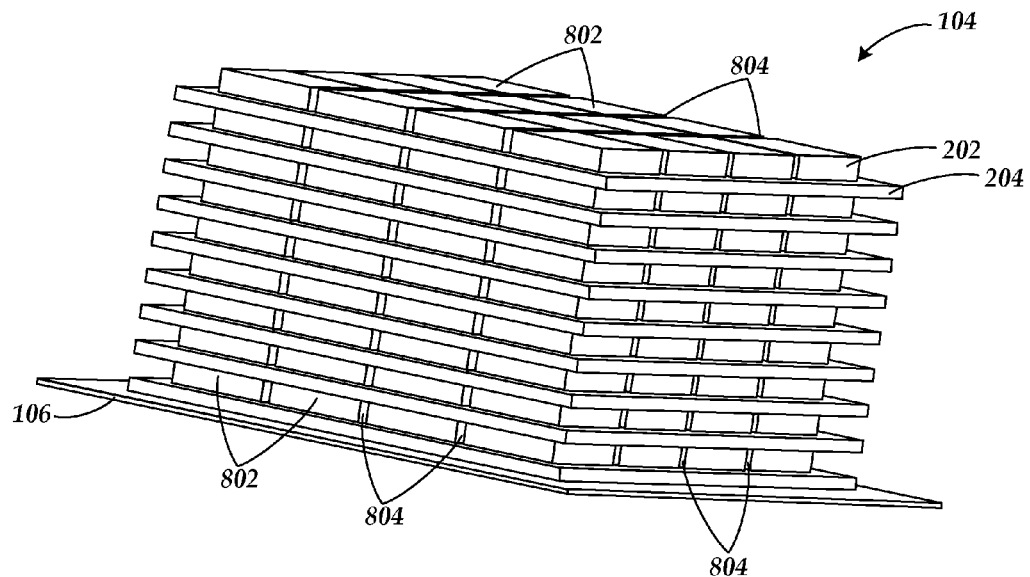
FIG. 8 is a perspective view of an example heat transfer stack of an electrocaloric effect heat transfer system having stress relief gaps incorporated within electrocaloric effect material layers.
Figure 9:
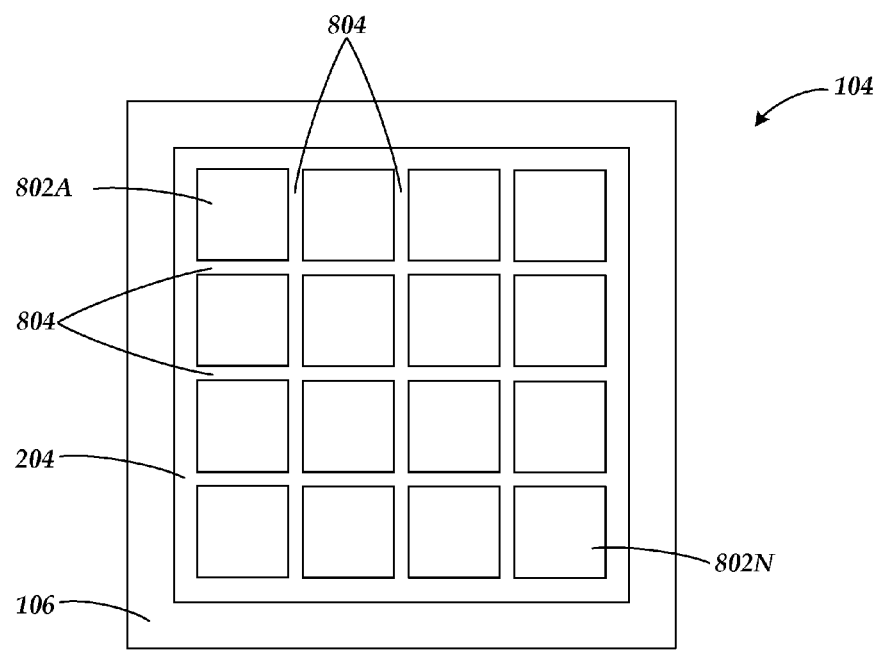
FIG. 9 is a top view of the example heat transfer stack of FIG. 8.

FIG. 8 is a perspective view of an example heat transfer stack 104 of an electrocaloric effect heat transfer system 100 having stress relief gaps 804 incorporated within electrocaloric effect material layers. FIG. 9 is a top view of the example heat transfer stack 104 of FIG. 8. Looking at these two figures, it can be seen that the stress relief gaps 804 divide the electrocaloric effect material 202 into multiple electrocaloric effect material segments 802A-802N, collectively referred to as "802." Some embodiments may include a 4×4 array of electrocaloric effect material segments 802, but any number, shape, and configuration of electrocaloric effect material segments 802 is contemplated.

According to various implementations, the stress relief gaps 804 can be filled with a gap-filling material having a high electric field resistance, but poor adhesion to the electrocaloric effect material 202 in order to prevent edge-surface breakdown when a voltage is applied across the electrocaloric effect material layer and stress relief gaps 804. According to some embodiments, the gap-filling material may be hydrogen sulfide gas. According to other embodiments, various fluorocarbon liquids or electrical greases may be utilized as gap-filling materials. The gap-filling material may have a lower elastic modulus than the elastic modulus associated with the electrocaloric effect material 202 to absorb conformational changes of the electrocaloric effect material 202 without allowing gaps to form between the electrocaloric effect material 202 and the gap-filling material. According to some embodiments, the gap-filling material may have a breakdown voltage per meter that is greater than a voltage per meter applied to create the electric field. According to other embodiments, the stress relief gaps 804 are left unfilled and the electrocaloric effect heat transfer device 102 is packaged in an environment that resists electrical breakdown, such as in a vacuum or within hydrogen sulfide gas or other appropriate gas. It should be appreciated that the stress relief gaps 804 are shown in FIGS. 8 and 9 without the gap-filling material for clarity purposes.

The stress relief gaps 804 may be generated in any suitable manner. According to some embodiments, the stress relief gaps 804 can be created lithographically, or by cutting the material while on a separate elastic carrier and stretching the carrier before thermal transfer. Alternatively, the stress relief gaps 804 may be cut into the electrocaloric effect material layers using a tool that removes the cut material, or by a saw having an appropriate kerf.

Figure 10:
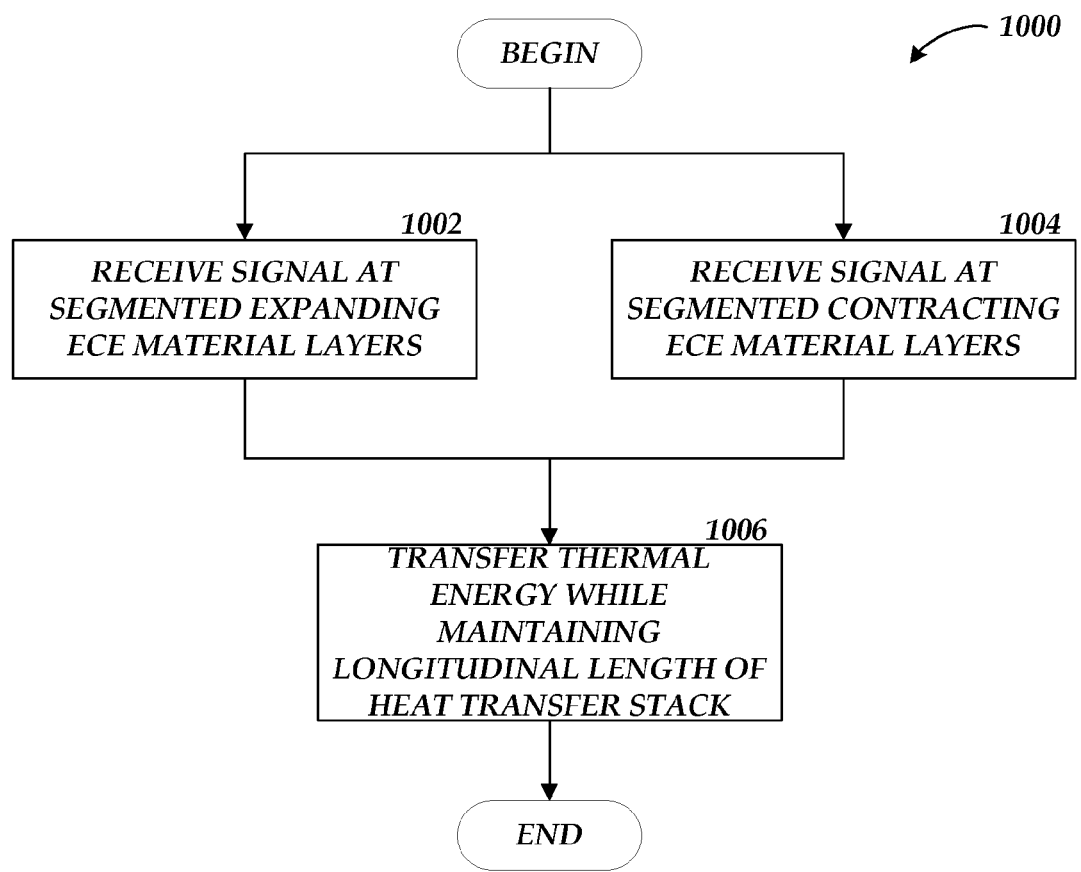
FIG. 10 is a flow diagram illustrating an example process for implementing an electrocaloric effect heat transfer device to reduce stress induced by dimensional changes of electrocaloric effect material during application of an electric field.

FIG. 10 is a flow diagram illustrating an example process 1000 for implementing an electrocaloric effect heat transfer device 102 to reduce stress induced by dimensional changes of electrocaloric effect material 202 during application of an electric field. The process 1000 may include various operations, functions, or actions as illustrated by one or more of blocks 1002-1006. It should be appreciated that more or fewer operations may be performed than shown in the FIG. 10 and described herein. Moreover, these operations may also be performed in a different order than those described herein.

The process 1000 may begin at block 1002 (Receive Signal at Segmented Expanding ECE Material Layers), where one or more electrode control signals may be received from the power source 110 at the electrodes 114 of the expanding electrocaloric effect material layers 202A of the heat transfer stacks 104. The controller 112 may be configured to control the application of this electrode control signal from the power source 110 according to an operational status of the heat source 106, a temperature of the heat source 106, a predetermined schedule, or any other desired factor. According to various implementations, the expanding electrocaloric effect material layers 202A may or may not be configured as electrocaloric effect material segments 802 having stress relief gaps 804 between the segments to accommodate lateral dimensional changes. As described above, the electrode control signal may include an oscillating signal that can be provided as any of a variety of voltage or current waveforms to create an electric field to alternately activate and deactivate the electrocaloric effect material segments 802 of the heat transfer stacks 104. Block 1002 may be performed concurrently with block 1004.

At block 1004 (Receive Signal at Segmented Contracting ECE Material Layers), where one or more electrode control signals may be received from the power source 110 at the electrodes 114 of the contracting electrocaloric effect material layers 202B of the heat transfer stacks 104. The controller 112 may again be configured to control the application of this electrode control signal from the power source 110 according to an operational status of the heat source 106, a temperature of the heat source 106, a predetermined schedule, or any other desired factor. As described above, according to various implementations, the contracting electrocaloric effect material layers 202B may or may not be configured as electrocaloric effect material segments 802 having stress relief gaps 804 between the segments to accommodate lateral dimensional changes. The electrode control signal may include an oscillating signal that can be provided as any of a variety of voltage or current waveforms, and may be applied substantially concurrently to the expanding electrocaloric effect material layers 202A as described with respect to block 1002.

According to an alternative implementation, the oscillating voltage or other signal applied across the expanding electrocaloric effect material layers 202A may be different than the oscillating voltage or other signal applied across the contracting electrocaloric effect material layers 202B. In this embodiment, the controller 112 may determine the amplitude, frequency, or other signal characteristic to apply to the respective electrocaloric effect material layers to control the amount of expansion and contraction and control the corresponding stresses. As an example, the transition rate, or ramp slope, and timing of the expanding and contracting electrocaloric effect material layers 202A/202B may be substantially matched. Any temporary longitudinal length change that occurs during the transition between expansion and contraction may be transitory, occurring and correcting in less time than the mechanical settling time of the characteristic modes of the heat transfer device 102 to minimize the stress experienced by the interfaces between layers. This matching may include different ramp slopes and timing for the expanding and contracting electrocaloric effect material layers 202A/202B. Blocks 1002 and 1004 may be followed by block 1006.

At block 1006 (Transfer Thermal Energy While Maintaining Longitudinal Length of Heat Transfer Stack), the expanding electrocaloric effect material layers 202A and the contracting electrocaloric effect material layers 202B react to the electrode control signal to alternatingly activate and deactivate, transferring thermal energy from the heat source 106 to the heat dump 108, while the layers of thermal rectifier material 204 limit the return flow of thermal energy toward the heat source 106. According to the various embodiments described above, due to the expansion and contraction characteristics of the electrocaloric effect material layers and to the segmented electrocaloric effect material layers with configured with stress relief gaps 804, the longitudinal stress 310 and the lateral stress 710 are both eliminated or mitigated during this thermal energy transfer operation. The process 1000 ends when the desired thermal energy transfer operations are terminated.

Figure 11:
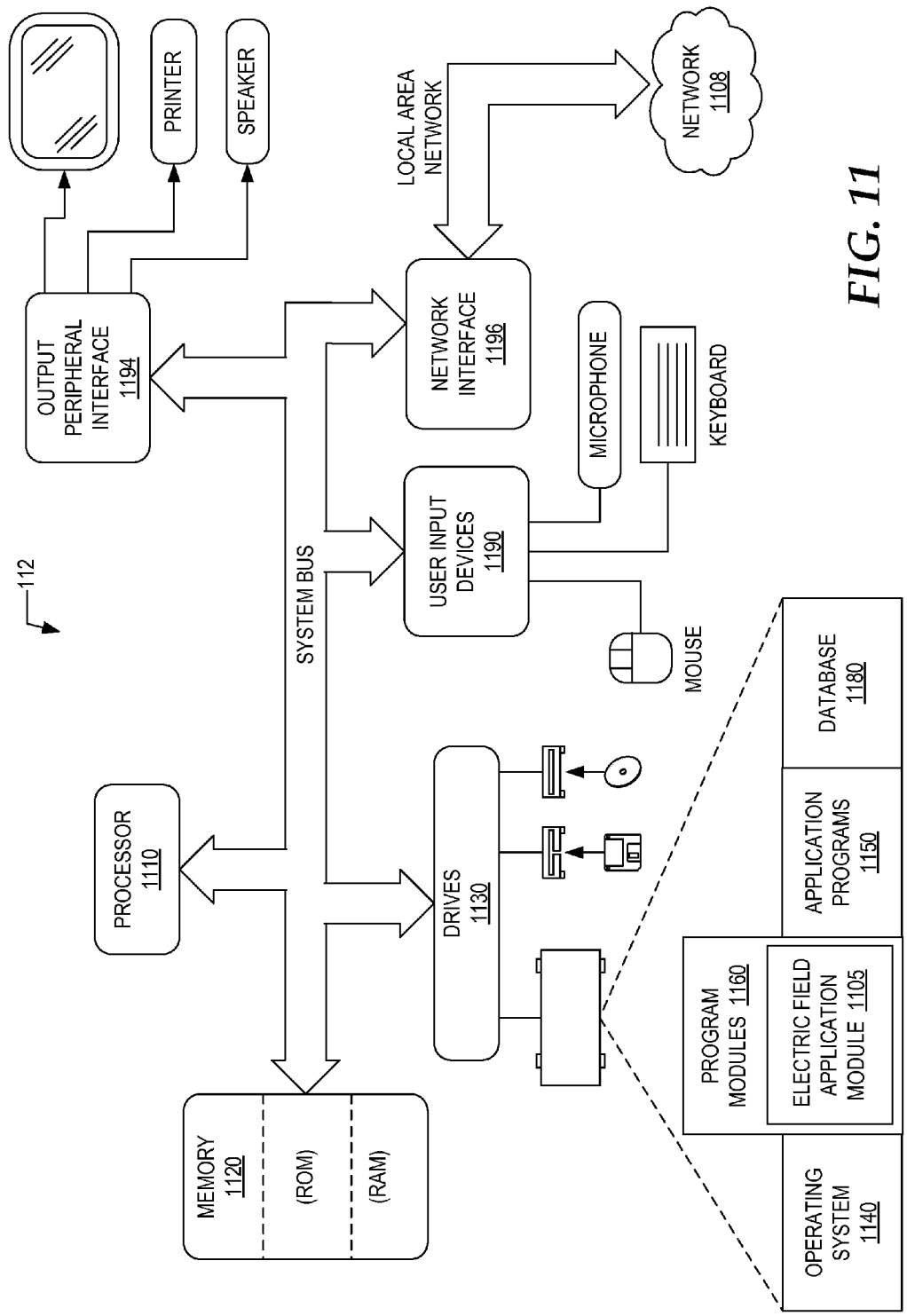
FIG. 11 is a block diagram illustrating a computer hardware architecture corresponding to an example controller, all arranged in accordance with at least some embodiments described herein.

FIG. 11 is a block diagram illustrating a computer hardware architecture corresponding to an example controller 112 configured in accordance with at least some embodiments presented herein. FIG. 11 includes a controller 112, including a processor 1110, memory 1120 and one or more drives 1130. The controller 112 may be implemented as a conventional computer system, an embedded control computer, a laptop, or a server computer, a mobile device, a set-top box, a kiosk, a vehicular information system, a mobile telephone, a customized machine, or other hardware platform.

The drives 1130 and their associated computer storage media, provide storage of computer readable instructions, data structures, program modules and other data for the controller 112. The drives 1130 can include an operating system 1140, application programs 1150, program modules 1160, and a database 1180. The program modules 1160 may include an electric field application module 1105. The electric field application module 1105 may be adapted to execute the process 1000 for implementing an electrocaloric effect heat transfer device 102 to reduce stress induced by dimensional changes of electrocaloric effect material 202 during application of an electric field as described in greater detail above (e.g., see previous description with respect to one or more of FIGS. 1-10). The controller 112 further includes user input devices 1190 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be coupled to the processor 1110 through a user input interface that is coupled to a system bus, but may be coupled by other interface and bus structures, such as a parallel port, game port or a universal serial bus ("USB"). Computers such as the controller 112 may also include other peripheral output devices such as speakers, which may be coupled through an output peripheral interface 1194 or the like.

The controller 112 may operate in a networked environment using logical connections to one or more computers, such as a remote computer coupled to a network interface 1196. The remote computer may be a personal computer, a server, a router, a network PC, a peer device or other common network node, and can include many or all of the elements described above relative to the controller 112. Networking environments are commonplace in offices, enterprise-wide area networks ("WAN"), local area networks ("LAN"), intranets, and the Internet.

When used in a LAN or WLAN networking environment, the controller 112 may be coupled to the LAN through the network interface 1196 or an adapter. When used in a WAN networking environment, the controller 112 typically includes a modem or other means for establishing communications over the WAN, such as the Internet or the network 1108. The WAN may include the Internet, the illustrated network 1108, various other networks, or any combination thereof. It will be appreciated that other mechanisms of establishing a communications link, ring, mesh, bus, cloud, or network between the computers may be used.

According to some embodiments, the controller 112 may be coupled to a networking environment. The controller 112 may include one or more instances of a physical computer-readable storage medium or media associated with the drives 1130 or other storage devices. The system bus may enable the processor 1110 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 1120, whether characterized as RAM, ROM, flash, or other types of volatile or nonvolatile memory technology. The media may also represent secondary storage, whether implemented as the storage drives 1130 or otherwise. Hard drive implementations may be characterized as solid state, or may include rotating media storing magnetically-encoded information.

The storage media may include one or more program modules 1160. The program modules 1160 may include software instructions that, when loaded into the processor 1110 and executed, transform a general-purpose computing system into a special-purpose computing system. As detailed throughout this description, the program modules 1160 may provide various tools or techniques by which the controller 112 may participate within the overall systems or operating environments using the components, logic flows, and/or data structures discussed herein.

The processor 1110 may be constructed from any number of transistors or other circuit elements, which may individually or collectively assume any number of states. More specifically, the processor 1110 may operate as a state machine or finite-state machine. Such a machine may be transformed to a second machine, or specific machine by loading executable instructions contained within the program modules 1160. These computer-executable instructions may transform the processor 1110 by specifying how the processor 1110 transitions between states, thereby transforming the transistors or other circuit elements constituting the processor 1110 from a first machine to a second machine. The states of either machine may also be transformed by receiving input from the one or more user input devices 1190, the network interface 1196, other peripherals, other interfaces, or one or more users or other actors. Either machine may also transform states, or various physical characteristics of various output devices such as printers, speakers, video displays, or otherwise.

Encoding the program modules 1160 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 1160 may transform the physical state of the semiconductor memory 1120 when the software is encoded therein. For example, the software may transform the state of transistors, capacitors, or other discrete circuit elements constituting the semiconductor memory 1120.

As another example, the storage media may be implemented using magnetic or optical technology such as drives 1130. In such implementations, the program modules 1160 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to transfer thermal energy from a heat source to a heat dump, the method comprising:
   applying at least one electric field across a first electrocaloric effect material layer and across a second electrocaloric effect material layer of a heat transfer device in thermal contact with the heat source and the heat dump; and
   in response to the applied at least one electric field, transferring thermal energy between the first electrocaloric effect material layer and the second electrocaloric effect material layer in a direction from the heat source toward the heat dump while restricting thermal energy transfer in a direction from the heat dump toward the heat source and at least partially canceling a dimensional change of the first electrocaloric effect material layer due to expansion by a dimensional change of the second electrocaloric effect material layer due to contraction so as to maintain an approximate total length of the heat transfer device.

2. The method of claim 1, wherein the approximate total length of the heat transfer device corresponds to a fixed distance between the heat source and the heat dump.

3. The method of claim 1, wherein applying the at least one electric field across the first electrocaloric effect material layer and across the second electrocaloric effect material layer comprises:
   applying an electric field across a plurality of first electrocaloric effect material layers effective to provide an aggregate longitudinal expansion distance that includes as a contribution the dimensional change of the first electrocaloric effect material layer due to expansion; and
   applying the electric field across a plurality of second electrocaloric effect material layers to provide an aggregate longitudinal contraction distance that is substantially equivalent to the aggregate longitudinal expansion distance, wherein the aggregate longitudinal contraction distance includes as a contribution the dimensional change of the second electrocaloric effect material layer due to contraction.

4. The method of claim 3, wherein applying the electric field across the plurality of first electrocaloric effect material layers and across the plurality of second electrocaloric effect material layers comprises:
   applying a first voltage across the plurality of first electrocaloric effect material layers effective to provide the aggregate longitudinal expansion distance; and
   applying a second voltage across the plurality of second electrocaloric effect material layers effective to provide the aggregate longitudinal contraction distance,
   wherein the first voltage and the second voltage are determined such that the aggregate longitudinal contraction distance is approximately equivalent to the aggregate longitudinal expansion distance.

5. The method of claim 4, wherein the first voltage is different than the second voltage.

6. The method of claim 3, wherein the electric field comprises one of: an oscillating voltage, a pulsed signal, a pulsed direct current (DC) voltage, an alternating current (AC) voltage, a ramped signal, a sawtooth signal, or a triangular signal.

7. The method of claim 1, wherein applying the at least one electric field across the first electrocaloric effect material layer and across the second electrocaloric effect material layer comprises simultaneously applying the at least one electric field across the first electrocaloric effect material layer and across the second electrocaloric effect material layer.

8. A method to transfer thermal energy from a heat source to a heat dump through a heat transfer device, the method comprising:
   expanding a first electrocaloric effect material layer and contracting a second electrocaloric effect material layer of the heat transfer device, wherein the heat transfer device is in thermal contact with the heat source and the heat dump; and
   transferring thermal energy between the first electrocaloric effect material layer and the second electrocaloric effect material layer in a direction from the heat source toward the heat dump while restricting thermal energy transfer in a direction from the heat dump toward the heat source and at least partially canceling expansion of the first electrocaloric effect material layer by contraction of the second electrocaloric effect material layer so as to maintain an approximate total length of the heat transfer device.

9. The method of claim 8, wherein the approximate total length of the heat transfer device corresponds to a fixed distance between the heat source and the heat dump.

10. The method of claim 8, wherein:
    expanding the first electrocaloric effect material layer comprises applying a first electric field across the first electrocaloric effect material layer; and
    contracting the second electrocaloric effect material layer comprises applying a second electric field across the second electrocaloric effect material layer.

11. The method of claim 10, wherein applying the first electric field across the first electrocaloric effect material layer comprises applying the first electric field across a plurality of first electrocaloric effect material layers effective to provide an aggregate longitudinal expansion distance that includes as a contribution an expansion distance of the first electrocaloric effect material layer.

12. The method of claim 11, wherein applying the second electric field across the second electrocaloric effect material layer comprises applying the second electric field across a plurality of second electrocaloric effect material layers to provide an aggregate longitudinal contraction distance that includes as a contribution a contraction distance of the second electrocaloric effect material layer.

13. The method of claim 10, wherein applying the first electric field across the first electrocaloric effect material layer comprises applying a first voltage across a plurality of first electrocaloric effect material layers effective to provide an aggregate longitudinal expansion distance that includes as a contribution an expansion distance of the first electrocaloric effect material layer.

14. The method of claim 13, wherein:
applying the second electric field across the second electrocaloric effect material layer comprises applying a second voltage across a plurality of second electrocaloric effect material layers effective to provide an aggregate longitudinal contraction distance that includes as a contribution a contraction distance of the second electrocaloric effect material layer; and
the first voltage and the second voltage are determined such that the aggregate longitudinal contraction distance is approximately equivalent to the aggregate longitudinal expansion distance.

15. The method of claim 14, wherein applying a first value of the first voltage is not equal to applying a second value of the second voltage.

16. The method of claim 10, wherein applying the first electric field or the second electric field comprises applying one of: an oscillating voltage, a pulsed signal, a pulsed direct current (DC) voltage, an alternating current (AC) voltage, a ramped signal, a sawtooth signal, or a triangular signal.

17. A method to transfer heat through a heat transfer device between a heat source and a heat dump, the method comprising:
applying a first electric field to a first electrocaloric effect material configured to expand and to change temperature of the first electrocaloric effect material in response to application of the first electric field;
applying a second electric field to a second electrocaloric effect material configured to contract and to change temperature of the second electrocaloric effect material in response to application of the second electric field, wherein a thermal rectifier material of the heat transfer device is in thermal contact with the first electrocaloric effect material and the second electrocaloric effect material;
transferring thermal energy, facilitated by the thermal rectifier material, between the first electrocaloric effect material and the second electrocaloric effect material in a direction from the heat source toward the heat dump while maintaining an approximate total length of the heat transfer device; and
limiting transfer of the thermal energy, facilitated by the thermal rectifier material, between the second electrocaloric effect material and the first electrocaloric effect material.

18. The method of claim 17, wherein maintaining the approximate total length of the heat transfer device comprises maintaining a first longitudinal distance associated with an expansion of the first electrocaloric effect material in response to application of the first electric field to be approximately equivalent to a second longitudinal distance associated with a contraction of the second electrocaloric effect material in response to application of the second electric field.

19. The method of claim 17, further comprising:
providing a plurality of layers of the first electrocaloric effect material;
providing a plurality of layers of the second electrocaloric effect material; and
providing a plurality of thermal rectifier material layers disposed between adjacent layers of the first and second electrocaloric effect materials.

20. The method of claim 19, wherein maintaining the approximate total length of the heat transfer device comprises:
expanding each of the plurality of layers of the first electrocaloric effect material a first longitudinal distance along a longitudinal axis of the heat transfer device in response to application of the first electric field; and
contracting each of the plurality of layers of the second electrocaloric effect material a second longitudinal distance along the longitudinal axis of the heat transfer device in response to application of the second electric field.

21. The method of claim 17, wherein applying the first and second electric fields comprise:
controlling application of the first and second electric fields from a power source to the first and second electrocaloric effect materials during operation of the heat source to:
control expansion of each of a plurality of layers of the first electrocaloric effect material a first longitudinal distance along a longitudinal axis of the heat transfer device in response to application of the first electric field, and
control contraction of each of a plurality of layers of the second electrocaloric effect material a second longitudinal distance along the longitudinal axis of the heat transfer device in response to the application of the second electric field,
wherein an aggregate contraction of the plurality of layers of the second electrocaloric effect material is approximately equivalent to an aggregate expansion of the plurality of layers of the first electrocaloric effect material.

22. A heat transfer system, comprising:
a heat source;
a heat dump;
a heat transfer device in thermal contact with the heat source and the heat dump, the heat transfer device comprising:
a first electrocaloric effect material layer;
a second electrocaloric effect material layer in thermal contact with the first electrocaloric effect material; and
a plurality of electrodes positioned to apply at least one electric field across the first and second electrocaloric effect material layers to transfer thermal energy between the first and second electrocaloric effect material layers in a direction from the heat source toward the heat dump while thermal energy transfer in a direction from the heat dump toward the heat source is restricted, wherein a dimensional change of the first electrocaloric effect material layer due to expansion is at least partially cancelled by a dimensional change of the second electrocaloric effect material layer due to contraction so as to maintain an approximate total length of the heat transfer device.

23. The heat transfer system of claim 22, wherein the heat dump is separated from the heat source by a fixed distance and the approximate total length of the heat transfer device corresponds to the fixed distance.

24. The heat transfer system of claim 22, wherein:
the heat source comprises an electronic component or a computer component; and
the heat dump comprises an electronics case or a computer case.

25. The heat transfer system of claim 22, wherein the at least one electric field comprises a first electric field and a second electric field, and wherein the plurality of electrodes comprises:
a plurality of first electrodes positioned to apply the first electric field across the first electrocaloric effect material; and a plurality of second electrodes positioned to apply the second electric field across the second electrocaloric effect material; the heat transfer system further comprising:

a power source electrically coupled to the plurality of first electrodes and the plurality of second electrodes and configured to provide a first electrode control signal to the plurality of first electrodes that is effective to cause the plurality of first electrodes to apply the first electric field and to provide a second electrode control signal to the plurality of second electrodes that is effective to cause the plurality of second electrodes to apply the second electric field; and a controller communicatively coupled to the power source and configured to control application of the first and second electrode control signals by the power source.

* * * * *